United States Patent [19]
Orzol et al.

[11] Patent Number: 5,768,583
[45] Date of Patent: Jun. 16, 1998

[54] METHOD AND SYSTEM FOR NETWORK PRINTER QUICK CONFIGURATION

[75] Inventors: Roman Orzol, Marlton, N.J.; Kevin Agatone, Broomall, Pa.; Tim Deppa, Cherry Hill; Ponna Arumgam, Medford, both of N.J.

[73] Assignee: Oki America, Inc., Hackensack, N.J.

[21] Appl. No.: 665,626

[22] Filed: Jun. 18, 1996

[51] Int. Cl.$^6$ ..................................................... G06F 9/00
[52] U.S. Cl. .................... 395/651; 395/200.5; 395/830
[58] Field of Search ........................... 395/830, 200.5, 395/200.51, 200.52, 651, 652, 653, 101, 109, 114, 828

[56] References Cited

U.S. PATENT DOCUMENTS

| | | | |
|---|---|---|---|
| 5,537,626 | 7/1996 | Kraslavsky et al. | 395/828 |
| 5,613,160 | 3/1997 | Kraslavsky et al. | 395/836 |
| 5,638,497 | 6/1997 | Kimber et al. | 395/114 |
| 5,657,448 | 8/1997 | Wadsworth et al. | 395/200.5 |
| 5,699,495 | 12/1997 | Snipp | 395/114 |

FOREIGN PATENT DOCUMENTS 0602 786 A   6/1994   European Pat. Off. .

OTHER PUBLICATIONS

Held, Andrew, *Data Communications*, "Distributed Applications", vol. 20, No. 4, Mar. 1991, pp. 27, 28, 30, 32, 34 and 36.

Hickerson, L. Brooks et al., *IEEE Spectrum*, "Managing Networked Workstations", vol. 29, No. 4, Apr. 1992, pp. 55, 56, 58.

von Kurt Hellinga et al., *NTZ Nachrichtentechnische Zeitschrift*, "Vereinfachtes Konfigurations–und Änderungsmanagement in verteilten IT–Umgebungen", vol. 48, No. 5, May 1995, pp. 8–11, 14, 15.

*Primary Examiner*—Kevin A. Kriess
*Attorney, Agent, or Firm*—Panitch Schwarze Jacobs & Nadel, P.C.

[57] ABSTRACT

A computer network has a printing device with an associated print server and print queue, each having a designated name. A user selects the printing device to be configured, and it is determined whether the user wishes to create a new print server name to be associated with the printing device. If the user wishes to do so, the user inputs a unique print server name. If the user does not wish to do so, the user selects a print server name from a compiled list of existing print server names. Thereafter, it is determined whether the user wishes to create a new print queue name to be associated with the print server name and the printing device. If the user wishes to create a new print queue name, a default print queue name is created and it is determined whether the user wishes to accept the created print queue name. If the user does not wish to accept the created print queue name, the user inputs a unique print queue name. If the user does not wish to create a new print queue name, the user selects a print queue name from a compiled list of existing print queue names. The user then confirms that the printing device is to be configured according to the designated print server name and the designated print queue name.

7 Claims, 8 Drawing Sheets

METHOD AND SYSTEM FOR NETWORK PRINTER QUICK CONFIGURATION

This application claims priority to Provisional Application Ser. No. 60/001,601 filed Jul. 27, 1995, which is incorporated herein by reference.

FIELD OF THE INVENTION

The present invention relates generally to the configuration of a printing device or printer residing within a computer network. More particularly, the present invention relates to a method for quickly and efficiently configuring such a printer with a minimum number of steps and a minimum amount of user interaction so that the printer can begin servicing print requests from network users.

BACKGROUND OF THE INVENTION

As is generally well known, a printing device or printer may reside within a computer network for access by any of a plurality of network users to print network documents. Such a printer includes hardware and firmware or software for operating the printer within the network.

The firmware is either embedded as part of the printer or is available in an attachment product to the printer. The hardware facilitates the communications between the printer and other devices physically attached to the network. Typically, communication between network devices is achieved by the transmission and reception of formatted data packets. Accordingly, the firmware facilitates the creation and deciphering of the data packets.

The network operating system defines the use of and controls the flow of data packets on the network. The network and the network operating system provide services including printing, filing, security, and e-mail, among other things. One known network operating system is the NOVELL NetWare network operating system. The NetWare environment includes client network devices, server network devices, and the network operating system.

Each client network device can request the use of services provided by one or more of the server network devices. Accordingly, each server device needs to know how to communicate to the network operating system to offer its respective service. In turn, the network operating system needs to know how to recognize each server devices. Moreover, each client device needs to know how to communicate to the network operating system to find services.

As is known, the configuration of the network defines the relationships between the client network devices, server network devices, and the network operating system. In the preferred embodiment of the present invention, discussed below, a method for building such a configuration and interfacing to the server devices, the network operating system, and the client devices is disclosed.

To install a network print server device, a user or operator typically performs a series of actions which configure the printer and the network operating system to establish the relationship therebetween. Most printer vendors provide software tools or utilities which help to perform the configuration. Likewise, the network vendor provides tools to configure the network print system to recognize the network printer. The print system refers to the method the operating system employs for deploying printing services. The NetWare system, for example, employs a utility entitled 'PCONSOLE'.

To install and configure a network printer using NetWare tools, a print server must first be created by inserting a unique name into a list of defined print servers. Additionally, a print queue must be created by inserting a unique name into a list of defined queues. Next, a link must be established between the printer server and the queue by inserting the print server name into a queue servers list kept by the queue. Accordingly, the queue is associated with the printer server and the print server can query the queue for print jobs.

Thereafter, the network print server must be configured to behave as the print server defined using PCONSOLE. To do so usually requires the running of a utility provided by the network print server vendor. Such utility typically detects the print server and allows the name and optional parameters of the print server to be configured to match those previously defined by the NetWare tools.

Some print server providers have attempted to simplify the aforedescribed process by incorporating some of the PCONSOLE functions into their utilities. For example, the HEWLETT-PACKARD JetAdmin utility allows the entry of a print server name in one WINDOWS-type dialog box and the creation or selection of a print queue for use with the print server in another dialog box. However, the use of multiple boxes and the necessity of multiple configuration operations may be cumbersome and/or confusing to a novice user.

SUMMARY OF THE INVENTION

The present invention solves the aforedescribed problem by providing a method that allows for the configuration of a network print server with the least number of steps and in a manner that is foolproof for the novice and guaranteed to complete correctly. The method also provides a flexible alternative to the experienced user to establish a quick configuration with minor modifications.

In the preferred embodiment of the present invention, a computer network is operated by a network operating system and has a printing device with an associated print server and print queue. The print server and the print queue each having a designated name.

A user selects the printing device to be configured, and it is determined whether the user wishes to create a new print server name to be associated with the printing device. If the user wishes to create a new print server name, the user inputs a unique print server name. If the user does not wish to create a new print server name, a list of existing print server names is compiled and the user selects a print server name from the compiled list.

Thereafter, it is determined whether the user wishes to create a new print queue name to be associated with the print server name and the printing device. If the user wishes to create a new print queue name, a default print queue name is created and it is determined whether the user wishes to accept the created print queue name. If the user does not wish to accept the created print queue name, the user inputs a unique print queue name.

If the user does not wish to create a new print queue name, a list of existing print queue names is compiled and the user selects a print queue name from the compiled list. The user then confirms that the printing device is to be configured according to the designated print server name and the designated print queue name.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF PREFERRED EMBODIMENTS

Figure 1:
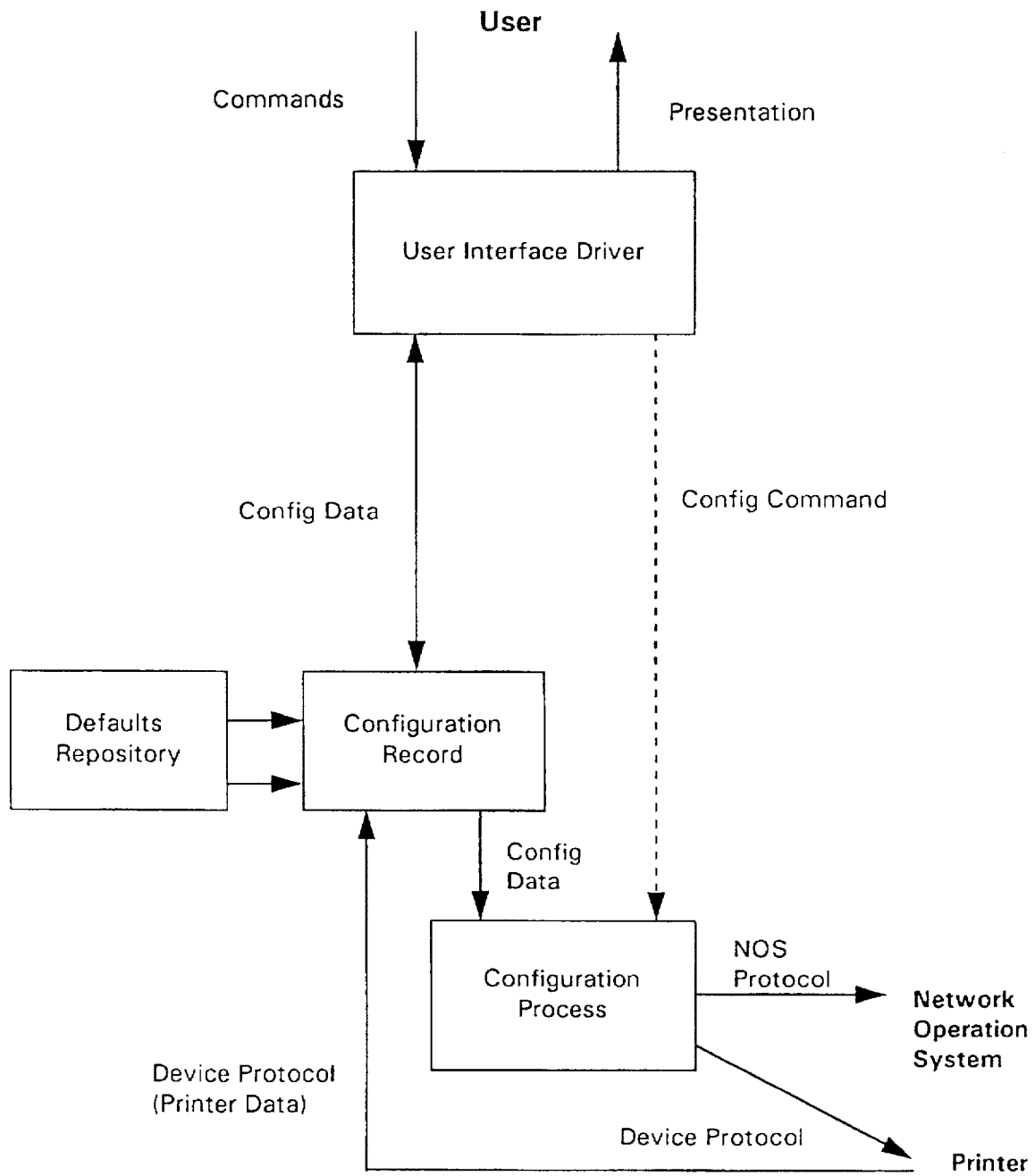
FIG. 1 is a block diagram of the components employed during configuration in accordance with the preferred embodiment of the present invention, and shows the interactions between such components.

Referring to the drawings in detail, wherein like numerals are used to indicate like elements throughout, there is shown in FIG. 1 a preferred embodiment of a system 10 for performing a quick network printer configuration includes a user interface driver 12, a defaults repository 14, a configuration record 16, and a configuration process component 18. The user interface driver 12 concisely presents the important information to a user or operator and minimizes user interaction.

The defaults repository 14 contains default information regarding default settings that may be employed during the quick configuration. More particularly, because of the amount of information which may be required to process the quick configuration, a set of defaults are needed during the actual configuration process. As should be understood, such defaults describe to the user interface driver 12 how to construct data if information is not provided by the user, and information the configuration process component 18 needs to communicate with a network operating system 20 and a network printer 22. In the preferred embodiment of the present invention, an interface (not shown) is provided to modify the default information in the defaults repository 14.

At the start of the quick configuration function, initial information is retrieved from the defaults repository 14 into the configuration record 16, additional information is retrieved into the configuration record 16 directly from the printer 22, and information in the configuration record 16 is retrieved into the user interface driver 12. Such additional information from the printer 22 includes current printer information and data needed to complete the configuration.

As the driver 12 interfaces with the operator, the driver makes changes to the configuration record 16, if necessary, with reference to the defaults repository 14. To provide maximum flexibility in the quick configuration system of the preferred embodiment of the present invention, most if not all initial information and additional information in the configuration record 16 must be allowed to be changed by the user by way of the user interface driver 12.

After the user is satisfied with the defined configuration, he or she issues a 'Config' Command by way of the driver 12, and the current contents of the configuration record 16 are employed by the configuration process component 18 to complete the configuration process completely and accurately. In particular, the component 18 configures the printer 22 using a printer-control protocol, and configures the network operating system 20 using an intrinsic network operating system protocol. As should be evident, the printer-control protocol may be a standard protocol such as the Simple Network Management Protocol (SNMP) or a device-proprietary protocol, and the intrinsic network operating system protocol may be Application Programmer Interface (API) tools provided by the network operating system vendor. After the configuration is complete and the link is made, the quick configuration process is finished.

Figure 2:
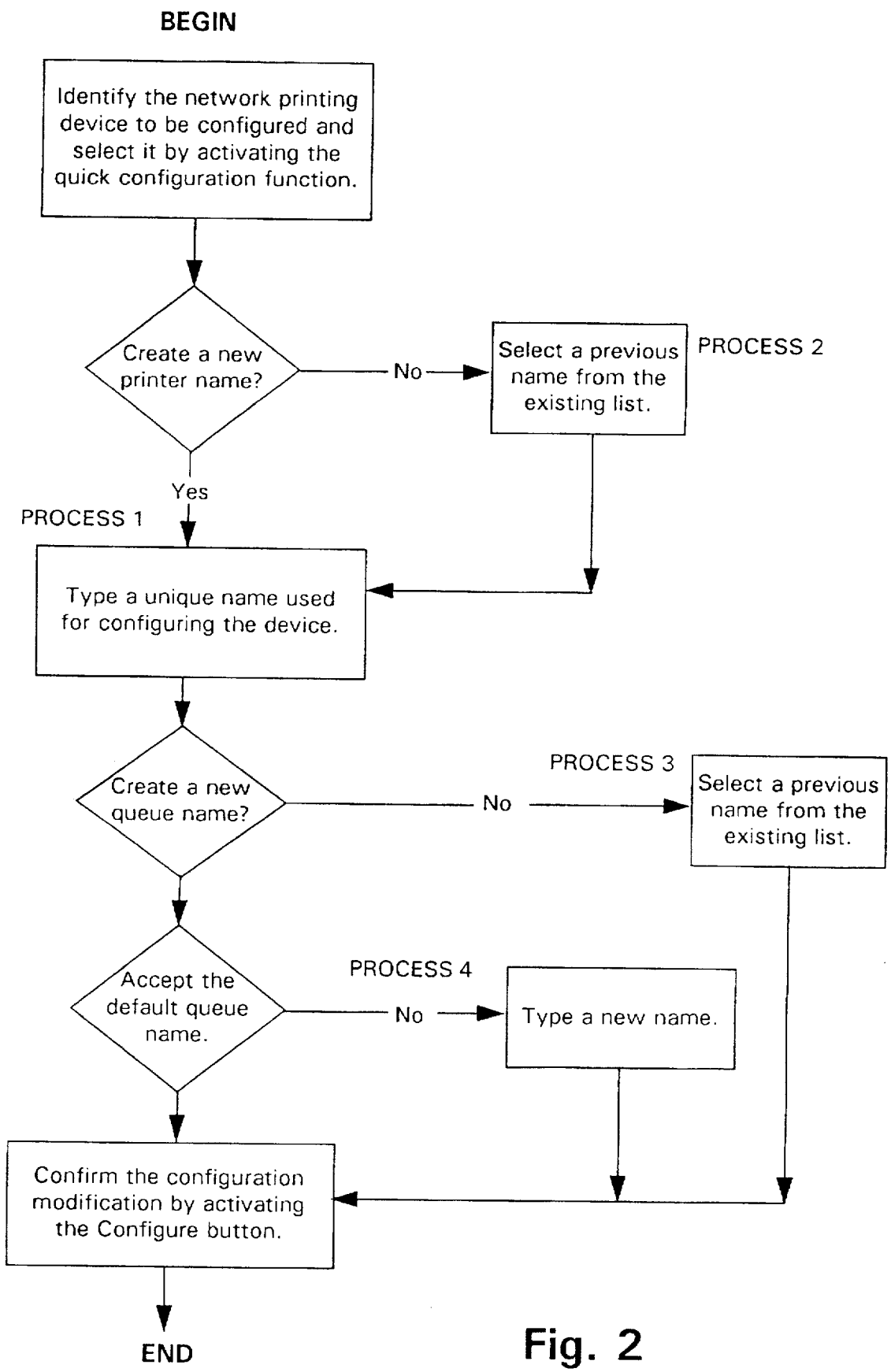
FIGS. 2 and 3 are flow diagrams illustrating the process steps performed by a user or operator (FIG. 2) and by the components shown in FIG. 1 (FIG. 3)
Figure 3:
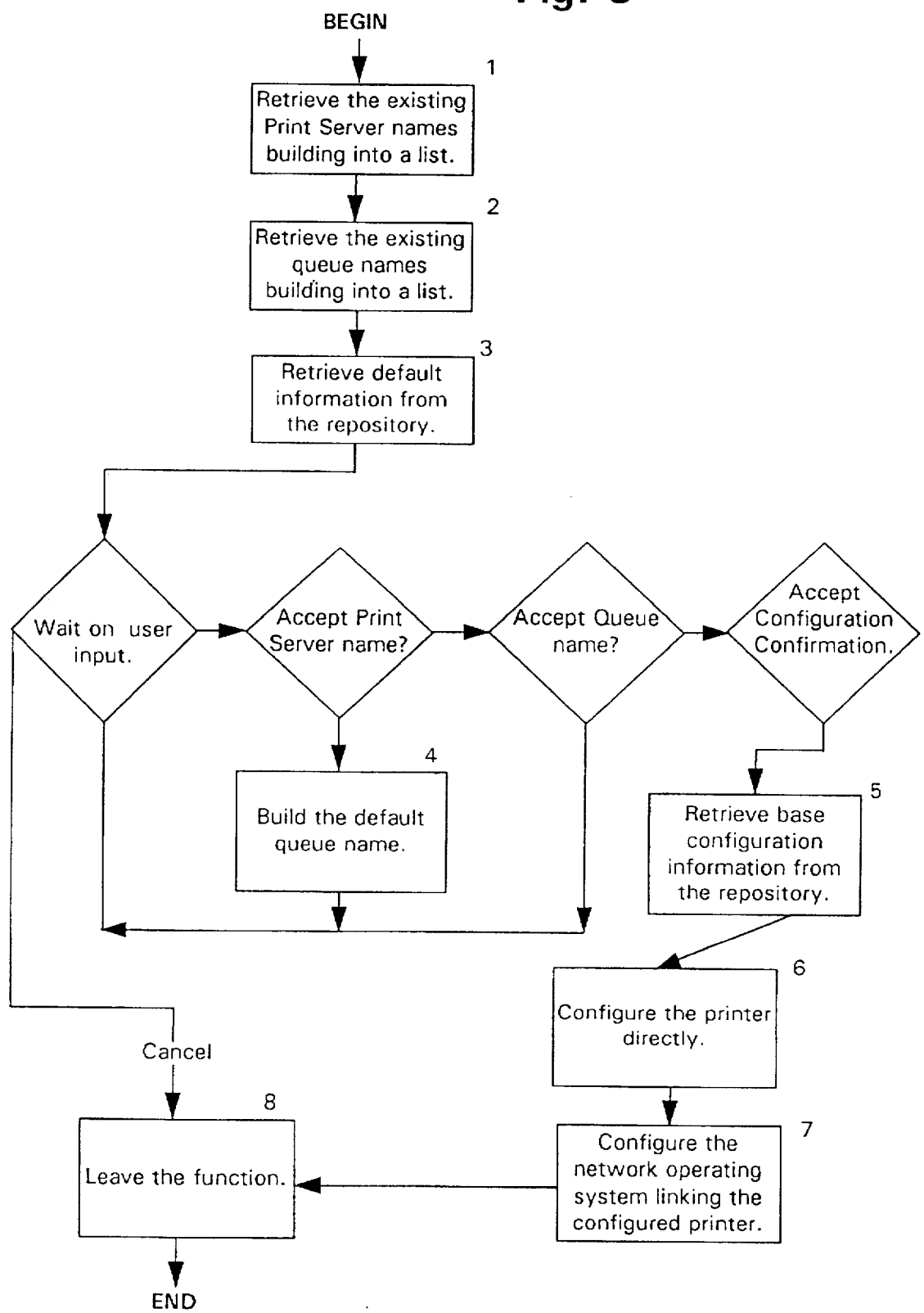
Figure 4:
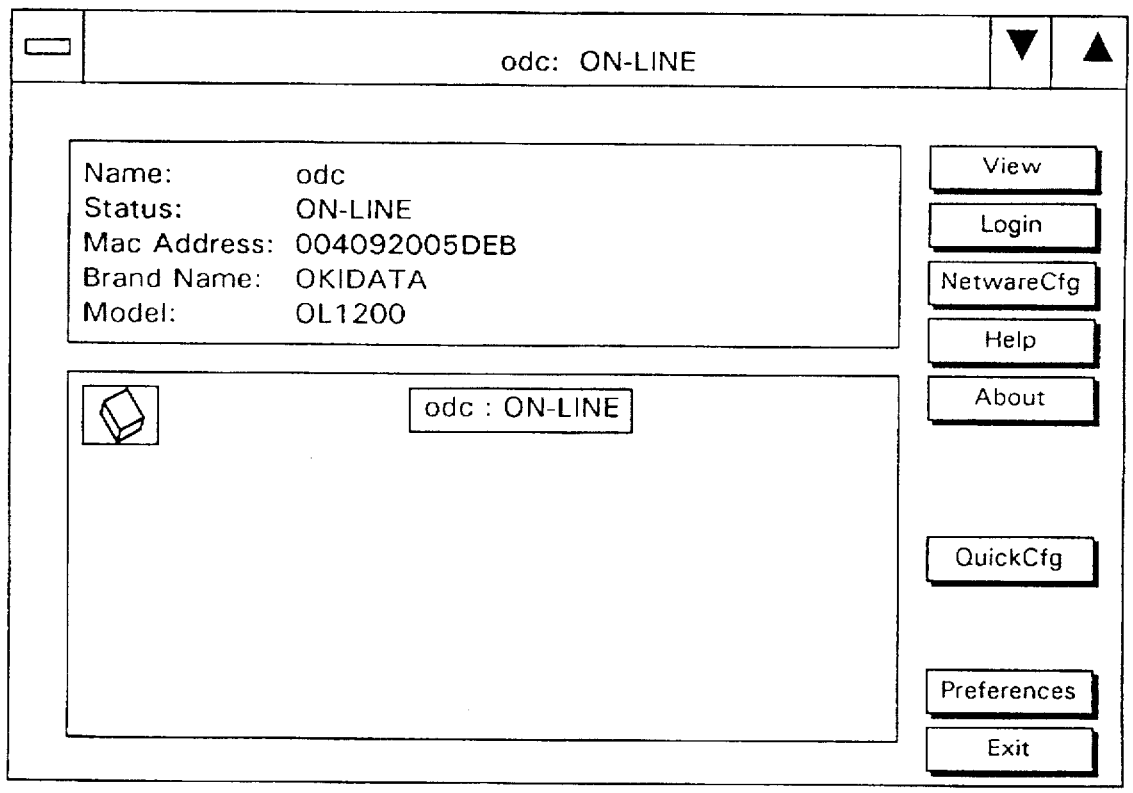
FIGS. 4-8 are WINDOWS-type dialog boxes employed during the performance of the steps shown in FIGS. 2 and 3.

Referring now to FIGS. 2 and 3, there is shown the process steps performed by the user (FIG. 2) and by the components shown in FIG. 1 (FIG. 3) in the preferred embodiment of the present invention. Preliminarily, and as seen at step 201 in FIG. 2, a user who wishes to configure a network printer 22 must first identify the printer 22 to be configured and select the printer 22 for configuration. Preferably, and as seen in FIG. 4, the user is presented with a WINDOWS-type dialog box on a video display for selecting a printer 22 for configuration, and the user activates the quick configuration function once the printer 22 is selected.

Once the quick configuration function has been activated, and referring now to FIG. 3, the user interface driver 12 of the system 10 retrieves existing print server names from a network database 24 by way of the network operating system 20 and builds the print server names into a list (step 301). Similarly, the user interface driver 12 of the system 10 retrieves existing queue names from the network database 24 by way of the network operating system 20 and builds the queue names into another list (step 302). Additionally, the user interface driver 12 of the system 10 retrieves default information from the default repository 14 into the configuration record 16 (step 303).

Figure 5:
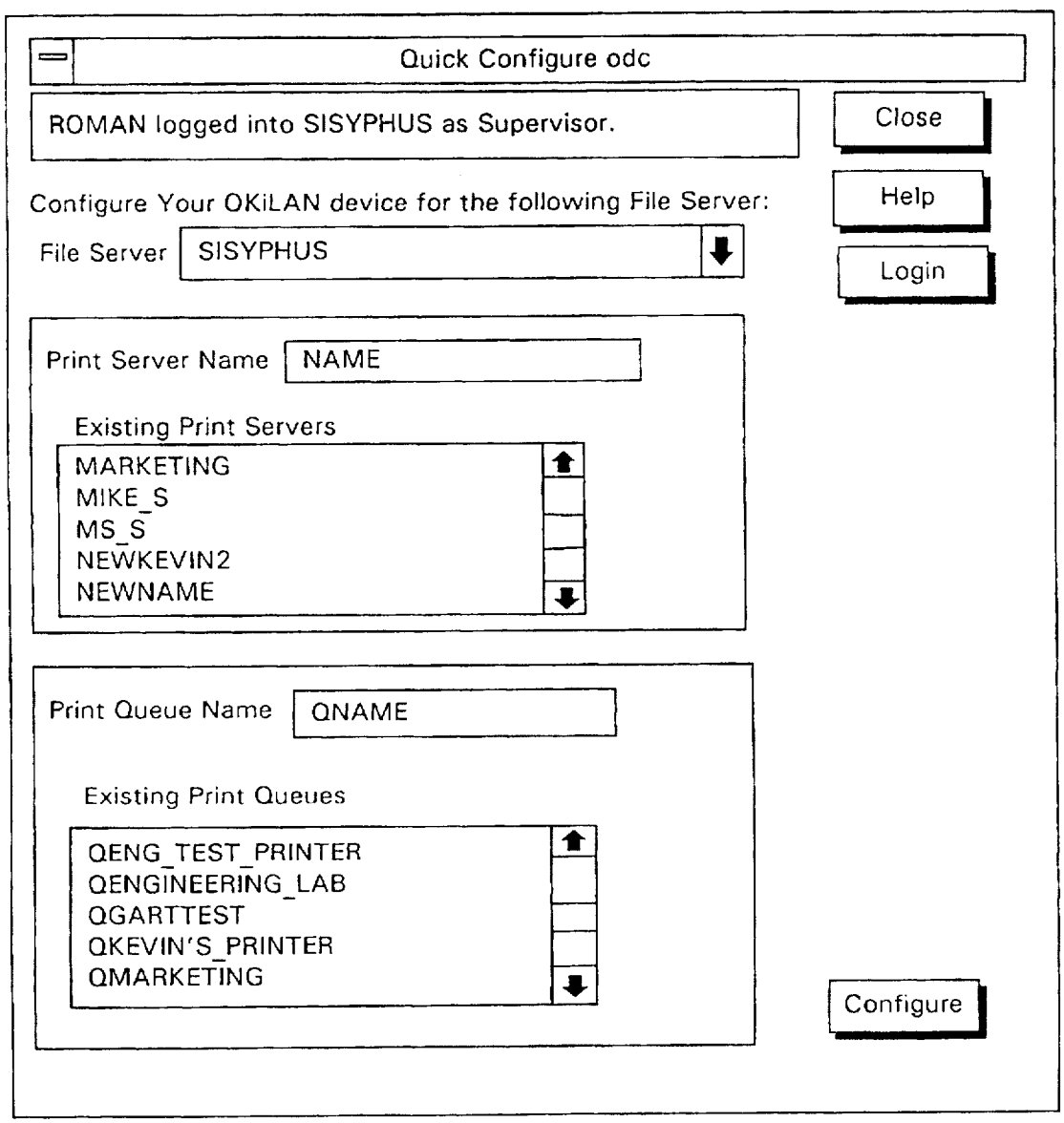

Thereafter, and referring now to FIG. 5, the user interface driver 22 presents a dialog box for allowing the user to input a print server name and a printer queue name, if he or she so desires, and then waits for user input (step 304). Specifically, the user can decide to create a new printer server name (step 202), in which case the user types a unique server name to be used for configuring the device (step 204), or the user can select a previous name from the built-up print server name list (step 203).

If the user interface driver 12 of the system 10 accepts the print server name selected by the user (step 305), the system 10 builds a default queue name (step 308). Preferably, the queue name is a string consisting of the letter 'Q' and the print server name placed immediately after, although one skilled in the art will recognize that any of a plurality of methods may be employed to build the default queue name.

Referring again to FIG. 2, the user is asked if he or she wishes to create a new queue name (step 205). If the user does not wish to create a queue name, he may select a queue name from the previously built-up queue name list (step 206). If the user does wish to create a new queue name, he or she may accept the suggested or default queue name (step 207) or input a new queue name (step 208).

Figure 6:
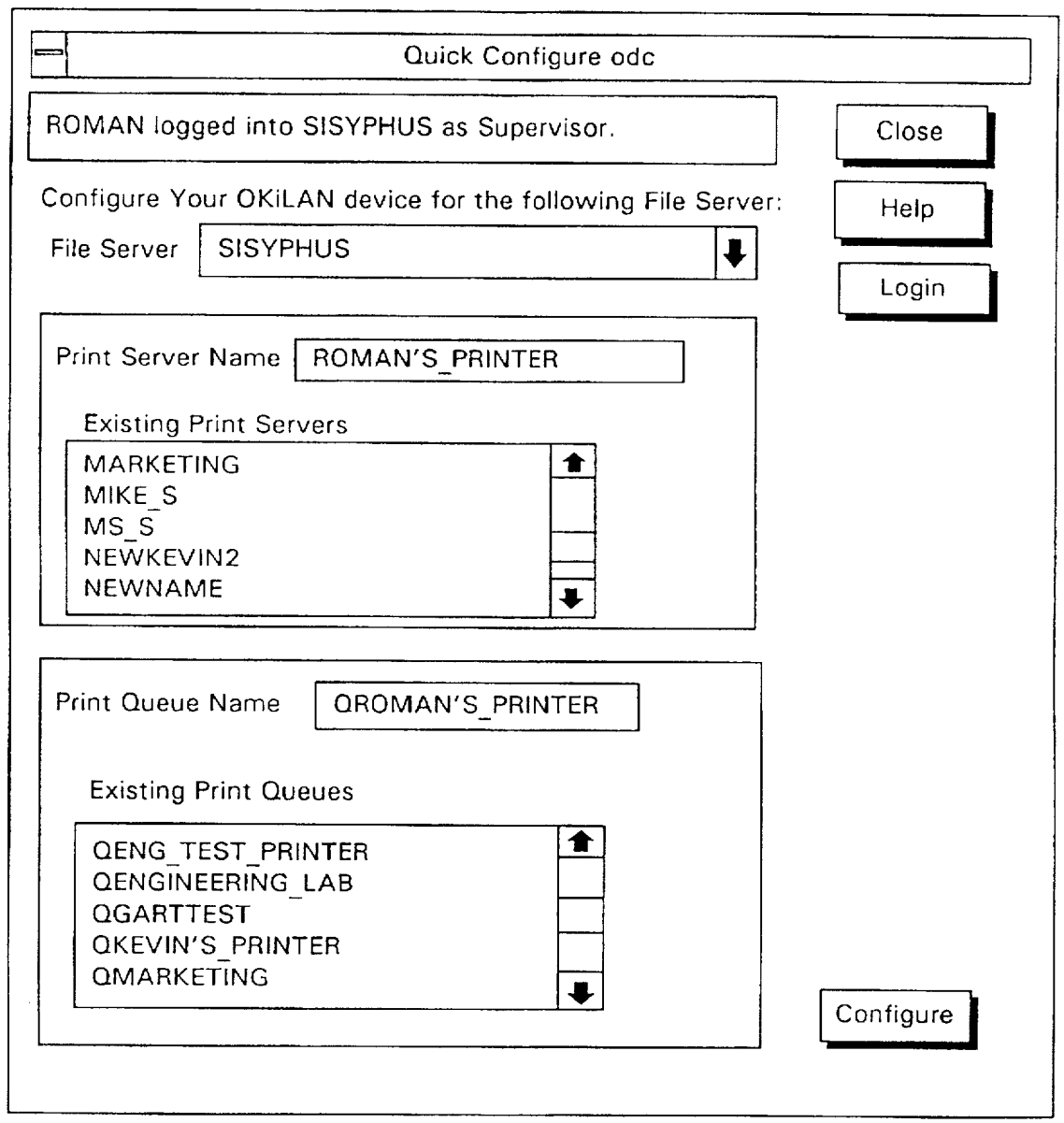

If the user interface driver 12 of the system 10 accepts the queue name selected by the user (step 306), the user then need only confirm the configuration modification (step 209). For example, and as seen in FIG. 6, once the user activates the configure button to confirm the configuration, the printer will be configured with the print server name "Roman's_printer" and with the printer queue name "QRoman's_printer".

Referring again to FIG. 3, once the configuration process 18 of the system 10 accepts the configuration confirmation (step 307), the configuration process component 18 may proceed with the actual configuration by retrieving base configuration information from the default repository 14 (step 309), configuring the printer 22 (step 310), and configuring the network operating system 20 and linking the configured printer 22 (step 311).

Figure 7:
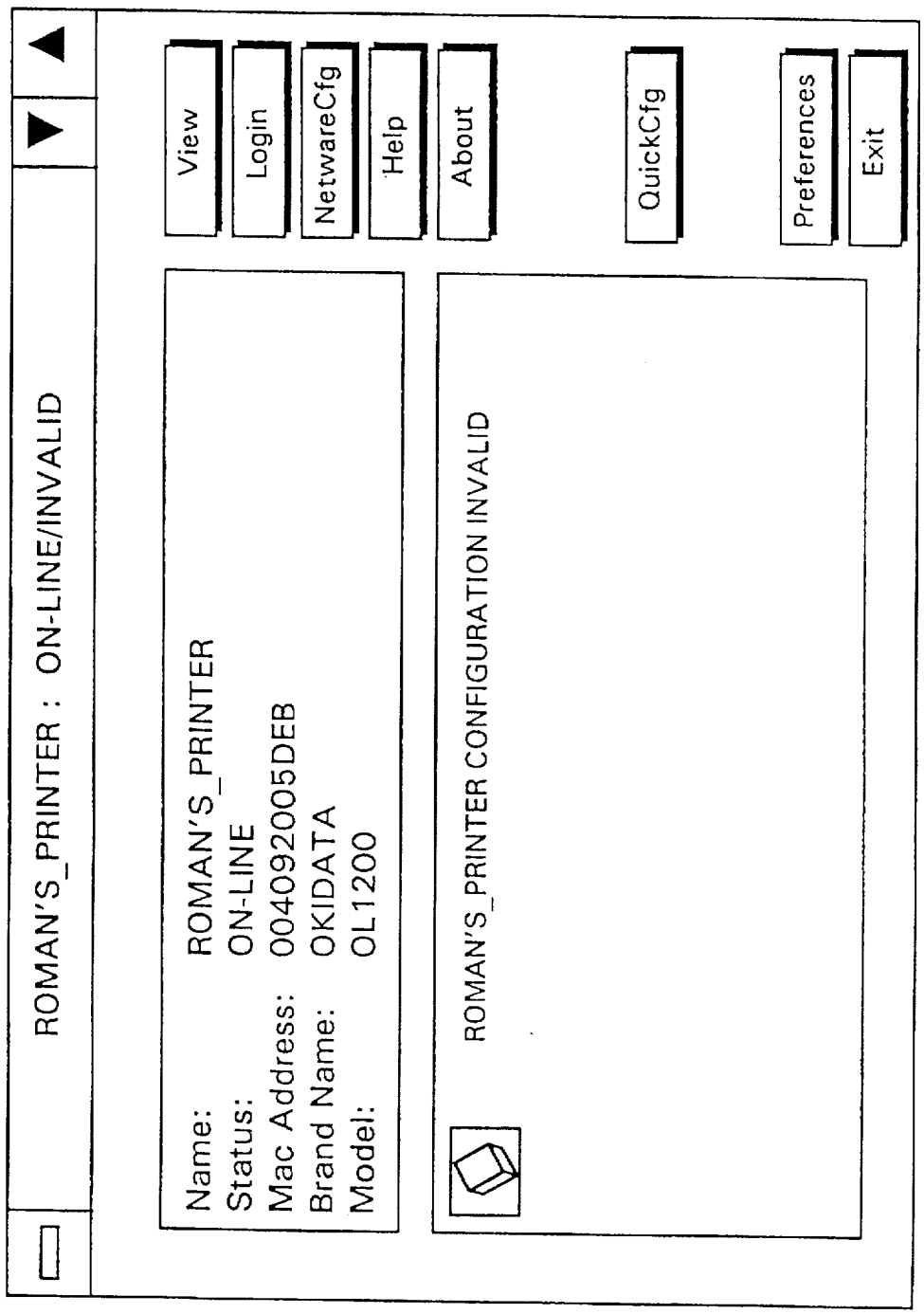
Figure 8:
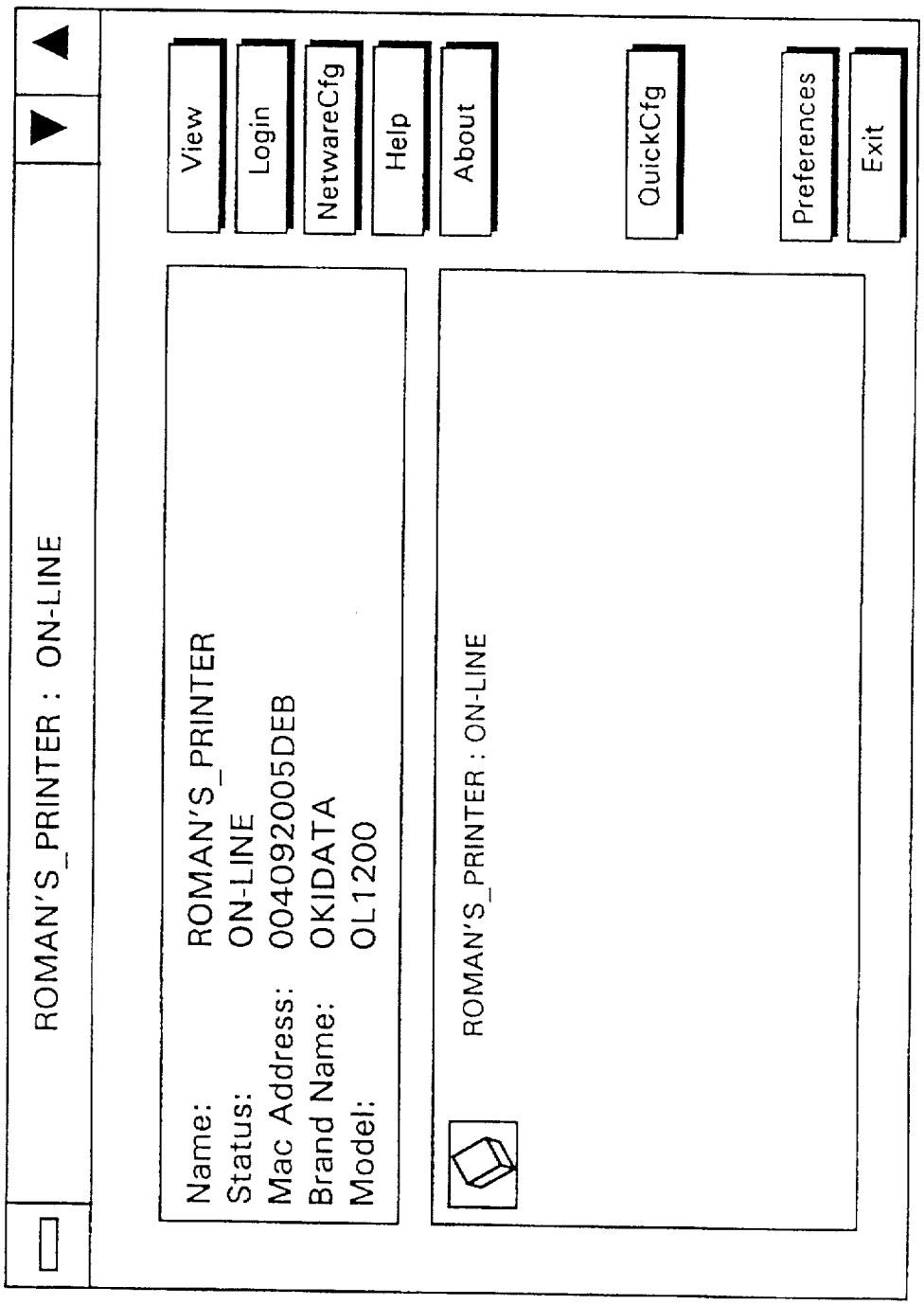

Once configured, the system 10 leaves the function (step 312) and the function ends. Preferably, if the configuration is not accepted, the user interface driver 12 presents a dialog box as seen in FIG. 7 to so indicate. Also preferably, and as seen in FIG. 8, the user interface driver 12 presents an appropriate dialog box to indicate that the function has ended successfully.

As should now be understood, the network printer quick configuration system and method discussed above is especially user-friendly in that, at a minimum, a user need only select a print server name from the built-up list of existing print server names (step 203). Moreover, the system and method are flexible in that a user is not limited to system-generated print server and queue names but instead can select his or her own names (steps 204, 206, 208). Importantly, though, the user need not enter a unique name or actively select a printer queue name unless he or she so chooses.

With the system and method for quickly configuring a network printer as was discussed above, a network printer may be quickly and efficiently configured by even a novice user without the need for multiple dialog boxes and multiple configuration operations. It will be appreciated by those skilled in the art that changes could be made to the embodiment described above without departing from the broad inventive concepts thereof. It is understood, therefore, that this invention is not limited to the particular embodiment disclosed, but it is intended to cover modifications within the spirit and scope of the present invention as defined by the appended claims.

We claim:

1. In a computer network operated by a network operating system and having a printing device with an associated print server and print queue, the print server and the print queue each having a name, a method for having a user of the network initiate a configuration of the printing device, the method comprising the steps of:

selecting, by the user, the printing device to be configured;
   determining whether the user wishes to create a new print server name to be associated with the printing device;
   inputting, by the user, a unique print server name if the user wishes to create a new print server name;
   determining whether the user wishes to create a new print queue name to be associated with the print server name and the printing device;
   creating a default print queue name if the user wishes to create a new print queue name; and
   confirming, by the user, that the printing device is to be configured according to the inputted print server name and the created print queue name.

2. The method of claim 1 further comprising the steps of:
   accepting the configuration confirmation;
   automatically retrieving configuration information from a configuration repository according to the print server name and the print queue name;
   automatically configuring the printing device according to the retrieved configuration information, the print server name, and the print queue name; and
   automatically configuring the network operating system according to the retrieved configuration information, the print server name, and the print queue name.

3. The method of claim 1 further comprising the steps of:
   compiling a list of existing print server names; and
   selecting, by the user, a print server name from the compiled list if the user does not wish to create a new print server name;
   wherein the confirming step comprises confirming that the printing device is to be configured according to the selected print server name and the created print queue name.

4. The method of claim 1 further comprising the steps of:
   compiling a list of existing print queue names; and
   selecting, by the user, a print queue name from the compiled list if the user does not wish to create a new print queue name;
   wherein the confirming step comprises confirming that the printing device is to be configured according to the inputted print server name and the selected print queue name.

5. The method of claim 1 further comprising the steps of:
   determining whether the user wishes to accept the created print queue name; and
   inputting, by the user, a unique print queue name if the user does not wish to accept the created print queue name;
   wherein the confirming step comprises confirming that the printing device is to be configured according to the inputted print server name and the inputted print queue name.

6. In a computer network operated by a network operating system and having a printing device with an associated print server and print queue, the print server and the print queue each having a designated name, a method for having a user of the network initiate a configuration of the printing device, the method comprising the steps of:

selecting, by the user, the printing device to be configured;
   determining whether the user wishes to create a new print server name to be associated with the printing device:
      if the user wishes to create a new print server name, having the user input a unique print server name;
      if the user does not wish to create a new print server name, compiling a list of existing print server names and having the user select a print server name from the compiled list;
   determining whether the user wishes to create a new print queue name to be associated with the print server name and the printing device:
      if the user wishes to create a new print queue name, creating a default print queue name and determining whether the user wishes to accept the created print queue name;
         if the user does not wish to accept the created print queue name, having the user input a unique print queue name;
      if the user does not wish to create a new print queue name, compiling a list of existing print queue names and having the user select a print queue name from the compiled list; and
   confirming, by the user, that the printing device is to be configured according to the designated print server name and the designated print queue name.

7. The method of claim 6 further comprising the steps of:
   accepting the configuration confirmation;
   automatically retrieving configuration information from a configuration repository according to the print server name and the print queue name;
   automatically configuring the printing device according to the retrieved configuration information, the print server name, and the print queue name; and
   automatically configuring the network operating system according to the retrieved configuration information, the print server name, and the print queue name.

* * * * *